United States Patent Office 3,586,738
Patented June 22, 1971

3,586,738
ADHESIVE COMPOSITION OF CHLORINE-CONTAINING ELASTOMER WITH o-ALKYL PHENOL-TERPENE RESIN
Henry P. Weymann and Frank V. Miller, Pensacola, Fla., assignors to Tenneco Chemicals, Inc.
No Drawing. Continuation of application Ser. No. 569,025, Aug. 1, 1966. This application June 10, 1969, Ser. No. 832,031
Int. Cl. C08f 29/20
U.S. Cl. 260—890
5 Claims

ABSTRACT OF THE DISCLOSURE

The present invention relates to novel adhesive compositions which do not contain a potentially heat hardenable, magnesia reactive resin. The binder of the adhesive composition comprises (1) a polymer of 2-chlorobutadiene-1,3 or another chlorine-containing elastomer and (2) an ortho-alkyl phenol-terpene resin. For each 100 parts of elastomer the binder contains 60 to 150 parts and preferably 70 to 120 parts of the terpene resin.

---

This application is a continuation of our application Ser. No. 569,025, filed Aug. 1, 1966, now abandoned.

The present invention relates to novel adhesive cements comprising a polymer of 2-chlorobutadiene-1,3 or one or more other chlorine-containing elastomers and certain terpene phenolic resins in which the phenolic component is mono-ortho-alkyl phenol.

A variety of adhesive compositions have been formulated from polymerized chloroprene, for example, neoprene, for bonding shoe components, automobile or other components, decorative laminates to plywood for counter tops, and for other bonding purposes. An acceptable adhesive should dry rapidly when applied in a film to one or more of the parts to be bonded and when the parts are brought together the adhesive must form a strong bond having a strong internal strength at both room and elevated temperatures. In addition the adhesive must be stable and not deteriorate in strength so that the parts are strongly bonded together over a long period.

Neoprene by itself is unsatisfactory for such adhesive purposes and many resins have been proposed or used with neoprene to form adhesives. Thermosetting, potentially heat hardenable, and magnesia reactive resins prepared from formaldehyde and para-alkyl-substituted phenols have been formulated with neoprene to form adhesive. In such formulations maximum strength is obtained with about from 40 to 50 parts of the heat hardenable resins per 100 parts of neoprene. About 60 parts of such a reactive resin tends to cause embrittlement. At times terpene-phenol resins have been added to adhesive formulations containing neoprene and potentially heat hardenable phenolic-aldehyde resins as plasticizing tackifiers. While terpene phenolic resins are useful for increasing tack, no more than the amount necessary to obtain the required degree of tackiness should be used as such resins decrease the ultimate cohesive strength of the bonding adhesive. Magnesium oxide and other oxides of Group II metals have been used in such adhesives as hydrogen chloride acceptors or stabilizers. Magnesium oxide also reacts with the potentially heat-hardenable resins. U.S. Pat. No. 3,144,428 discloses an adhesive composition containing neoprene, a potentially heat-hardenable para-substituted phenol-aldehyde resin reacted with magnesium oxide and a terpene-phenolic resinous reaction product as a tackifier.

While many of the prior art neoprene adhesive cements have been used extensively, the prior art adhesive have had certain drawbacks. The adhesives containing the magnesia reactive, potentially heat-hardenable or thermosetting resins, tend to change upon ageing. There is a definite limit to the amount of such resin which can be used without unduly decreasing the cohesive strength of the bond. This is an economic disadvantage in that neoprene is the more expensive component.

Surprisingly, we have discovered that non-magnesia reactive, ortho-alkylphenol-terpene resins and ortho-alkyl-phenol-terpene-formaldehyde resins have a greater degree of compatibility in neoprene adhesive formulations than the magnesium reactive terpene-phenolic resins and exhibit about the same or superior adhesive characteristics. In neoprene cement formulations containing the oxides of zinc and magnesium, or their equivalents, larger amounts of the present non-magnesium reactive resins can be used then the magnesium-reactive para-substituted phenol-formaldehyde resins with equivalent or superior adhesive characteristics.

The ortho-alkyl-phenol-terpene resins may be produced by the procedure described in U.S. Patent No. 2,343,845 in which terpene and ortho-alkylphenol are reacted in the presence of a molecular compound of boron trifluoride as a catalyst, followed by separation of the resinous reaction product. These resins may be used in neoprene adhesive cements although we prefer to react the foregoing resin with formaldehyde and separating the ortho-alkylphenol-terpene-formaldehyde reaction product from the reaction mixture. Typically, these resins generally will have a Ball and Ring Softening Point in the range of from 75° C. to 135° C. with the non-formaldehyde resins falling within a lower portion of this range and the formaldehyde-modified resins falling within an overlapping, higher portion of the range, for example, 90° C. to 135° C. The resin should have a Ball and Ring softening point above 90° C. and preferably above 100° C. The use of resins having a lower softening point results in lowering of the strength of the adhesive at elevated temperatures. Resins having softening points above 125° C. may be used although preferably the resin should have a softening point below 135° C. since higher melting point resins tend to have reduced compatibility in the neoprene cement systems.

The terpene may be any terpene hydrocarbon of the $C_{10}H_{16}$ series, for example, alpha-pinene, beta-pinene, dipentene, and mixtures of such terpene hydrocarbons, or naturally occurring mixtures, such as gum or wood turpentine.

The formaldehyde, if any, which may be charged for reaction with the ortho-alkylphenol-terpene resin may be formaldehyde, usually as an aqueous solution, or a polymer of formaldehyde, such as paraformaldehyde, trioxane, etc., which will depolymerize and release formaldehyde under the conditions of reaction. It is formaldehyde monomer which reacts regardless of whether monomeric or polymeric formaldehyde is added to the reaction mixture.

Cresol is the more readily available ortho-alkylphenol but other phenols having a single alkyl group on the benzene ring in a position ortho to the hydroxyl group may be used. Ortho-monoalkyl phenols containing up to 5 carbon atoms in the alkyl group which may be used are, for example, ortho-tert.-butyl phenol, ortho-propyl phenol, ortho-ethyl phenol, ortho-amyl phenol, or mixtures of such substituted phenols, to produce resins which are not potentially heat-advancing (thermosetting) and do not undergo further condensation when heated to 250° C. The present resins are not reactive with magnesium oxide or other oxides of the Group II metals and contain no acid moiety, having a zero acid number. In general, the more carbon atoms in the alkyl group, the more compatible the resin with the neoprene, and the branched-chain alkyl groups provide better antioxidant properties. These non-reactive and non-thermosetting properties are present regardless of whether or not the mono-alkyl-phenol-terpene resin is reacted with formaldehyde. For the sake of brevity the following comments will be directed to cresol-terpene resins but it is to be understood that they also apply to the use of terpene resins prepared from the other previously-mentioned ortho-alkyl phenols.

The relative amounts of reactants may be varied. From 0.7 to 1.3 moles of cresol may be reacted with one mole of terpene with the optimum amount of cresol being about one mole per mole of terpene. Larger amounts of cresol result in resins with less compatibility in the cement system, as evidenced by low values of "elongation at break" tensile tests, and yield cements with reduced cohesive strength, while the use of smaller amounts of cresol results in resins with too great a compatibility, the resins acting as plasticizers to greatly increase elongation at break and materially reduce the cohesive strength of the cement.

The amount of formaldehyde reacted with the terpene-cresol resin may vary from 0 to 1.5 moles per mole of terpene. Larger amounts of formaldehyde result in resins which yield cements with poorer ageing characteristics. At least 0.05 mole of formaldehyde is needed before there is any noticeable difference in the resin. The preferred amount of formaldehyde, if any, is from 0.07 to 1.3 moles per mole of terpene with the optimum amount of formaldehyde being about 0.1 mole per mole of terpene.

In discussing the relative amounts of reactants it is to be understood that we are referring to the amounts actually reacted, chemically combined, which may or may not be the same as the amounts added to the reaction mixture.

From 60 to 150 parts of the present terpene resins may be used per hundred parts by weight of neoprene with the preferred amounts of resin being in the range of from 70 to 120 parts per 100 parts of neoprene. In the preferred range, the lower concentrations of resin provide adhesive having somewhat higher cohesive strength, while the higher resin concentrations materially improve adhesion to non-porous polar surfaces and increase the open tack time, with about 120 parts of resin per 100 parts of neoprene forming a cement which is essentially pressure sensitive. The optimum amount of resin depends to a certain extent upon the properties desired. When the amount of resin is less than about 50 parts per hundred parts of neoprene, the adhesive have poor adhesion to non-porous surfaces, although the cohesive strength is excellent. When more than 120 parts and especially more than 150 parts of resin per 100 parts of neoprene are used, the adhesives have reduced cohesive strength due to the plasticizing action of the high resin content.

Any of the elastomers which are basically polymers of 2-chlorobutadiene-1,3, for example, the commercially available neoprenes, may be used in preparing the present adhesives. In addition, other chlorine-containing elastomers containing about the same amount of chlorine as neoprene may be used, for example, natural rubber and homopolymers or copolymers of butadiene-1,3, 2-methyl-butadiene-1,3, 3-methyl-butadiene-1,3, or mixtures of such elastomers chlorinated until they contain from 30 to 43% by weight of chlorine. Such chlorinated elastomers may be prepared by the process discussed in the article: Bloomfield, J. Chem. Soc., 1943, page 289. Mixtures of such chlorinated elastomers and elastomers of polychloroprene may be used. Copolymers of chloroprene and any one or more of the other previously-mentioned monomers may be prepared and then chlorinated, if necessary, to form an elastomer containing from 30% to .43% chlorine.

The adhesives of the present invention may include other resins such as those previously used with neoprene although we prefer the adhesives in which the binder portion is essentially composed of chlorine-containing elastomer and terpene-cresol resin. The expression "binder essentially composed of" does not, of course, exclude the presence of additives such as stabilizers, antioxidants, inert fillers, although inert fillers reduce the strength of the adhesives, and hydrogen chloride acceptors such as magnesium oxide, zinc oxide, or other oxides of the Group II metals which do not react with the present terpene resins. If such oxides are used, they may be present in an amount in the range of from 1% to 20% of the elastomer and preferably present in an amount in the range of from 8% to 15% by weight of the elastomer.

Homogeneous adhesive cements of the present invention may be prepared in a suitable manner. For example, the neoprene and cresol-terpene resin may be dissolved in a solvent along with the other soluble additives and the mixture stirred along with any insoluble additives, preferably in a finely-divided form. Alternatively, polychloroprene latex may be mixed with an emulsion of the resin prepared first by dissolving the resin, for example, in toluene, and then adding water with agitation to form an aqueous solution. The usual additives may be added with stirring to the elastomer-resin emulsion. The present cements also may be prepared as subsequently described in the present examples.

Adhesive cements were prepared and tested with various adhesive resins including resins of the present invention, commercially available heat-advancing, magnesium reactive resins and a terpene-phenol resin. The last two resins are included for comparative purposes. The same formulation described in Table I was used except for variations in the resin and in the amounts of resin as set forth in Table II.

TABLE I.—NEOPRENE CEMENT FORMATION

|  | Parts |
|---|---|
| Neoprene AC | 100 |
| Zinc oxide, rubber grade | 5 |
| Magnesium oxide, light calcined | 10 |
| "Neozone A," antioxidant, phenyl - alpha - naphthylamine | 2 |
| Resin (as shown in Table II as parts of resin per 100 parts of elastomer) | 117 |

The rubber, metal oxides, and antioxidant were dispersed by mixing on a laboratory rubber mill for thirty minutes. The cement solution was prepared by dissolving the compounded rubber mix and the appropriate amount of resin in toluene.

In testing the cements thus formulated, it was found advantageous to spread the solvent solution onto a silicone-coated release paper by means of a standard laboratory clearance coater to obtain, after evaporation of the solvent, a dry film of the cement approximately nine-thousandths of an inch in thickness. Formation of a dry, reactivatable film of uniform thickness for use in forming the bonds to be tested eliminated variations in bond strength which could be attributed to either heavy adhesive thickness or too little adhesive.

Number ten unsized cotton duck canvas and polished commercial aluminum plate, cleaned by immersion in hot chromic acid, were used in all cases to form the test bonds. Bonds were formed by applying the liquid cement to the cotton or metal substrate as both primer and reactivating medium for the dry cement film, permitting the applied cement to partially dry, and then laminating the dry cement film to the primed surface. After removal of the protective release paper, the adhesive films thus exposed were activated with a further thin prime coat of the cement and placed together in contact by hand pressure only, forming canvas-to-canvas and canvas-to-aluminum bonded assemblies with adhesive thicknesses at the bond line of about eighteen-thousandths inch. The bonded assemblies thus formed were dried for 24 hours at room temperature before initial fresh tests were made.

Peel strength of the test cements was measured by peeling, at a rate of twelve inches per minute jaw movement in a pendulum-type testing device according to ASTM D-903 except that cohesive strength only of the test cements was measured by separating two pieces of bonded canvas in a 'T' peel at a rate of 12 inches per minute. The force required to peel the canvas was recorded as pounds per inch of width of bonded area. This test was performed both at a controlled temperature of 72° F. with fresh bonds and after ageing for three weeks. Cohesive strength also was measured after conditioning the two bonded pieces of canvas at 180°–190° F. for five minutes and separating the pieces of bonded canvas in a 'T' peel at a rate of 12 inches per minute. This test of the conditioned bonded pieces was performed on freshly condtioned bonds at 140° F. and on conditioned bonds aged for three weeks at 72° F. as a measure of the heat resistance of the cement.

Adhesive strength of the test cements was measured by peeling a one-inch strip of bonded canvas from the aluminum panels, the peel force being recorded as pounds peel per inch of bond width. The test cement was measured for adhesive strength fresh and after ageing of the bond for three weeks at room temperature, 72° F.

Ageing stability of the bonds was measured indirectly by measurement of the change in tensile strength, pounds per square inch of original bond and percent elongation at break of the dry cement film after the three weeks ageing period at room temperature in accordance with the procedure of ASTM D-402. With many resins, continuing chemical reaction after formation of the bond between the resin and the other components of the adhesive system causes changes in the strength and the compatibility of the system. Those resins which react with the metal oxides and/or the neoprene matrix of the adhesive to cause a reinforcing action, as would be experienced by crosslinking, may be considered of value only if the reaction does not contribute to the formation of incompatibility within the system. A decrease in the compatibility of the various components of the system invariably results in an adverse hardening and gradual embrittlement of the cement, eventually destroying the effectiveness of the bond. While tensile strength of the dry cement film may be considered a good measurement of the cohesive strength of the cement, the change in percent elongation of the film at break may be considered a good indication of increasing or decreasing system compatibility, the elongation at break decreasing due to decreased compatibility of the system.

In Table II, several resins at various concentrations are compared in the standard test formulation. Examples 1 through 15 are listed as control tests, with the cements of Examples 16 through 21 being prepared from the resins under consideration in this application.

Example 1, in which no resin was added to the basic neoprene compound, shows the poor heat resistance and adhesive strengh exhibited by such a simple formulation. As expected, the ageing stability of this formulation is excellent with an increase in cohesive strength accompanied by an increase in system compatibility. The literature postulates that the increase in cohesive strength is the result of crosslinking of the neoprene by the magnesium oxide, a reaction which may be accelerated by moderate heating of the compound.

Examples 2 through 4 demonstrate the excellent adhesive and cohesive strength imparted to the cement through the usage of relatively small amounts of a commercially available oil-soluble, potentially heat reactive and magnesia reactive para-tertiary butyl phenol-formaldehyde Resin A having a Ball and Ring softening point of about 100° C. However, formulations containing as much as 75 parts of Resin A per 100 parts of neoprene are hard, brittle, and of little value as cements with low cohesive and adhesive strength. Furthermore, the slight decrease in elongation of the dry cement film indicates that the continuing chemical reaction which causes the increase in tensile strength does not improve and may even reduce the compatibility of the system, especially after prolonged ageing.

Examples 5 through 7 serve to emphasize the specific nature of the chemical composition of the tackifying-reinforcing resin. Resin B is a commercially available oil-soluble, heat-reactive para-capryl phenolformaldehyde resin having a softening point of about 100° C. Although this resin is comparable to Resin A in cohesive strength, it is poorer in heat resistance and adhesive strength and exhibits inferior ageing stability in the adhesive system.

Examples 8 through 10 show the adhesives characteristics of cements prepared with a commercially-available terpene phenolic recommended for use in this class of cements. Resin C is a thermoplastic, oil-soluble terpene phenolic resin, softening point 152° C., acid number 65. This resin improves cohesive strength but has only a minor effect on the heat resistance and the adhesive strength of the cement. The adhesive strength of this cement drops when the amount of Resin C is increased about 25 parts per 100 parts of neoprene. It is obvious from the changes in the tensile strength and the elongation that this resin continues to react with the system, the reaction products being compatible.

Examples 11 through 15 show the effect of the reaction product of two moles of turpentine with one mole of phenol, Resin D. Resin D exhibits an improvement in the cohesive strength and heat resistance of the cement compared to the use of neoprene without any resin. The adhesive strength is poor and the decrease in compatibility indicates poor ageing stability. Samples of bonds prepared with these cements increased in brittleness after continued ageing for four months to the extent that the bonds became relatively worthless.

No examples are given for cements prepared with the reaction product of one mole of turpentine with one mole of phenol as cements containing such resins were brittle when tested fresh and had little or no value.

Examples 16 and 17 show the properties of cements prepared with Resin E which is the reaction product of one mole of ortho-cresol with one mole of turpentine and indicate this resin imparts excellent cohesive strength and adhesive strength combined with adequate heat resistance. The relatively minor changes in elongation with age show this resin to have superior ageing properties in the cement system. Resin E had a Ball and Ring softening point of 94.5° C.

In Examples 18 and 19, the cements were prepared with Resin F made from the reaction of one mole of ortho-cresol, one mole of turpentine, and one-tenth mole of formaldehyde. These cements similarly show good to excellent adhesive properties combined with excellent ageing stability. Resin F had a Ball and Ring softening point of 108° C.

In Examples 20 and 21, the cements were prepared with Resin G which is the reaction product of one mole of ortho-cresol, one mole of turpentine, and 1.2 moles of formaldehyde and showed the same good to excellent adhesive characteristics combined with excellent ageing stability of Resins E and F, all of which are resins of the present invention. Resin G had a Ball and Ring softening point of 113° C.

TABLE II

| Example No. | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Formulation, parts by weight: | | | | | | | | | | | | | | | | | | | | | |
| Resin indentification | None | A | A | A | B | B | B | C | C | C | D | D | D | D | D | E | E | F | F | G | G |
| Resin weight (phr.) | | 25 | 50 | 75 | 25 | 50 | 75 | 25 | 50 | 75 | 25 | 50 | 75 | 80 | 100 | 80 | 100 | 80 | 100 | 80 | 100 |
| Cohesive strength: | | | | | | | | | | | | | | | | | | | | | |
| Room temperature: | | | | | | | | | | | | | | | | | | | | | |
| Fresh, 72° F | 55R | 81 | 74 | 19 | 98 | 77 | 50 | 74 | 74 | 40 | 66 | 57 | 43 | 62 | 60 | 73 | 79 | 68 | 63 | 79 | 70 |
| 72° F., aged 3 weeks | 54R | 88 | 82 | 15 | 94 | 50 | 37 | 60R | 15R | 47 | 91 | 95 | 97 | 74 | 66 | | 83 | 57 | 71 | 69R | 71 |
| Preconditioned at 180–190°F.: | | | | | | | | | | | | | | | | | | | | | |
| Fresh, 140° F | 6 | 49 | 46 | 33 | 53 | 36 | 23 | 7 | 6 | 5 | 35 | 34 | 29 | 25 | 15 | 21 | 18 | 23 | 17 | 27 | 19 |
| 72° F., aged 3 weeks | 5 | 49 | 50 | 34 | 43 | 29 | 21 | 10 | 9 | 10 | 35 | 36 | 29 | 28 | 24 | 27 | 20 | 26 | 22 | 29 | 25 |
| Adhesive strength: | | | | | | | | | | | | | | | | | | | | | |
| Fresh, 72° F | 9R | 45 | 49 | 7R | 27 | 26 | 34 | 24 | 13 | 8 | 11 | 10 | 17 | 16 | 18 | 43 | 41 | 25 | 32 | 40 | 57 |
| 72° F., aged 3 weeks | 6R | 48 | 63 | 5R | 39 | 48 | 18 | | | | | | | 49 | 34 | 85 | 65 | 40 | 34 | 62 | 37 |
| Tensile strength: | | | | | | | | | | | | | | | | | | | | | |
| Fresh, 72° F | 3,900 | 2,060 | 1,980 | 1,970 | 1,910 | 1,270 | 970 | 2,270 | 1,460 | 620 | 1,700 | 290 | 320 | 440 | 320 | 710 | 110 | 440 | 350 | 1,400 | 1,250 |
| 72° F., aged 3 weeks | 4,840 | 2,810 | 2,230 | 1,700 | 2,000 | 1,080 | 630 | 3,300 | 2,430 | 1,860 | 3,420 | 2,580 | 2,660 | 1,040 | 540 | 570 | 340 | 1,000 | 770 | 1,100 | 1,220 |
| Percent change | +24 | +36 | +13 | −9 | +5 | −19 | −35 | +45 | +64 | +200 | +101 | +790 | +730 | +136 | 69 | −20 | +209 | +127 | +120 | −21 | −2 |
| Elongation at break: | | | | | | | | | | | | | | | | | | | | | |
| Fresh, 72° F | 890 | 920 | 1,020 | 500 | 800 | 620 | 900 | 820 | 750 | 600 | 930 | 1,280 | 1,250 | 1,170 | 1,330 | 1,190 | 1,200 | 940 | 800 | 1,080 | 1,000 |
| 72° F., aged 3 weeks | 990 | 850 | 970 | 450 | 700 | 570 | 1,000 | 980 | 860 | 700 | 1,080 | 1,090 | 1,060 | 1,060 | 1,260 | 1,250 | 1,100 | 1,010 | 860 | 1,050 | 1,060 |
| Percent change | +11 | −8 | −5 | −10 | −13 | −8 | −89 | +19 | +16 | +17 | +16 | −16 | −15 | −9 | −5 | +5 | −8 | +7 | +8 | −3 | +6 |

In Table II the letter "R" indicates a resinous condition, not rubbery, and not useful as an adhesive. In this connection it is to be noted that in Example 20 the letter "R" accompanies the aged cohesive strength test which is in ambiguity and is not in agreement with the adhesive strength test or the results obtained with a larger amount of this resin.

In Example 17, the fresh tensile strength of "110" is not in agreement with the other tests on this sample and it is believed that this particular test result is not representative.

The results set forth in Table II show that with the magnesia-reactive, potentially heat-hardenable Resins A, B, and C, maximum cohesive strength is obtained with 50 parts or less of resin per 100 parts of rubber and that with 75 parts of such resin there is a material drop in cohesive strength. The turpentine-phenol Resin D greatly reduces the adhesive strength of the adhesive which was to be expected as this is a well-known effect of such tackifying resins.

In contradistinction, the resins of the present invention, Resins E, F, and G, can be used in large amounts to produce excellent results as shown by Table II.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

We claim:
1. An adhesive composition in which the binder is non-magnesia reactive and non-potentially heat-hardenable, said binder comprising a homogeneous blend of 100 parts by weight of at least one chlorine-containing elastomer selected from the group consisting of polychloroprenes, chlorinated natural rubber, chlorinated polymers of butadiene - 1,3, 2 - methyl-butadiene-1,3, 3-methyl-butadiene-1,3, and mixtures thereof, polymers of butadiene-1,3, 2-methyl-butadiene-1,3, 3-methyl-butadiene-1,3, and mixtures thereof, copolymerized with chloroprene, each of said elastomers containing from 30% to 43% by weight of chlorine; and from 60 to 165 parts by weight of a non-magnesia reactive, non-potentially heat-hardenable resinous reaction product of one mole of at least one terpene hydrocarbon reacted with from 0.7 to 1.3 moles, per mole of terpene, of at least one ortho-alkyl phenol containing from 1 to 5 carbon atoms in the alkyl group, said resinous reaction product having a Ball and Ring softening point in the range of from 90° C. to 135° C.

2. An adhesive composition as claimed in claim 1 containing 60 to 120 parts of the resinous reaction product.

3. An adhesive composition as claimed in claim 2 in which the orthoalkyl phenol is cresol.

4. An adhesive compositon as claimed in claim 3 in which the elastomer is polychloroprene.

5. An adhesive composition as claimed in claim 4 in which the resinous reaction product has a Ball and Ring softening point in the range of 90° C. to 125° C.

References Cited

UNITED STATES PATENTS 3,198,760    8/1965    Widenor _____ 260—890

SAMUEL H. BLECH, Primary Examiner

U.S. Cl. X.R.

161—215, 217, 255; 260—3.5, 29.7, 33.6, 38, 62, 845